United States Patent Office 3,081,595
Patented Mar. 19, 1963

3,081,595
ROCKET PROPULSION METHOD EMPLOYING CATALYTIC DECOMPOSITION OF HYDRAZINE
Leslie C. Rose, Rocky Mount, Va., assignor to Thompson Ramo Wooldridge Inc., Cleveland, Ohio, a corporation of Ohio
No Drawing. Filed June 15, 1960, Ser. No. 38,691
12 Claims. (Cl. 60—35.4)

This invention relates to rocket fuel decomposition and is more particularly concerned with methods and means for secondary catalytic decomposition of hydrazine containing fuels.

It has been discovered that the hydrazine decomposition process includes at least two imperceptible steps wherein hydrazine is first decomposed to ammonia and the elemental forms of nitrogen and hydrogen and then the ammonia decomposes into the elemental forms of nitrogen and hydrogen, all in the gaseous state. The initial decomposition of hydrazine results in reaction or decomposition chamber temperatures of approximately 2300° F. and the secondary decomposition of ammonia, being endothermic in nature, results in a reaction or decomposition chamber temperature reduction to approximately 1700° F. The above temperature levels, it will be appreciated, are exemplary, and the actual temperatures involved will depend upon a number of reaction chamber factors such as ambient temperature, reaction chamber wall thicknesses, reaction chamber wall conductance capacity and the like. In any event, the secondary temperature is in general lower than the primary decomposition temperature. This temperature reduction phenomenon of hydrazine disassociation permits the use of lighter weight and more readily available materials for exhaust nozzles. Additionally, if hydrazine is used as the gas generation means for a turbine assembly the reduction in temperatures of hydrazine disassociation permits introduction of the hot gases from the gas generator directly into the turbine, eliminates the requirement for turbines constructed of expensive refractory alloys, eliminates the requirement for cooling means for the gas generator exhaust conduit, and eliminates the requirement for pressure regulators for the exhaust conduit heretofore required in one aspect because of the differences in the effects of induced vibrations encountered by a gas generator spaced from the turbine means. Thus hydrazine containing fuels, because of the hydrazine disassociation phenomenon, are advantageously employed as fuels for rockets, missiles and related air and space-borne vehicles.

Hydrazine is a well known organic compound having a freezing point of approximately plus 35° F. and a specific gravity of approximately 1.0. Hydrazine is generally said to produce a specific impulse of 185 lbs. per lb./sec. To ensure the secondary decomposition of hydrazine generated ammonia, a catalyst is normally employed. The catalyst usually takes the form of coiled metal or screens in the gas generator spaced from the hydrazine inlets. Heretofore, such common metals as stainless steel wire, preferably 304 stainless steel, has proved satisfactorily to initiate decomposition of hydrazine fuel alone. However, where hydrazine is employed as a component of a composite fuel mixture, the decomposition temperature of which is above the decomposition temperature of hydrazine, the heretofore employed catalyst wires pitted and burned, in some cases, thereby rapidly destroying the wire.

By employment of my invention wherein platinum or palladium is utilized as the catalyst in a gas generator for hydrazine containing fuels, I substantially overcome the problems and difficulties of the prior art.

It is an aim of the present invention to provide catalysts for hydrazine fuel decomposition.

It is an object of the present invention to provide catalytic materials for promoting decomposition of hydrazine-containing fuels.

It is another object of the present invention to provide catalytic wires or screens for promoting decomposition of hydrazine containing fuels, the initial decomposition temperatures of which are above that of hydrazine decomposition.

It is another object of the present invention to provide wire catalysts for promoting decomposition of hydrazine-containing fuel mixtures which have higher decomposition temperatures than hydrazine.

It is another object of the present invention to provide a method for promoting catalytic decomposition of hydrazine containing fuels which have decomposition temperatures above that of hydrazine.

These and other features, objects and advantages of the present invention will become more apparent upon a careful consideration of the following detailed disclosure.

Briefly stated, the present invention involves the discovery that the metals platinum and palladium may be employed as catalysts in a gas generator for promoting decomposition of hydrazine generated ammonia from a rocket or missile fuel mixture comprising hydrazine and one or more other fuel components, the decomposition temperature of the mixture being above that of hydrazine.

Composite fuels including hydrazine have been prepared for such purposes as increasing the specific gravity of the fuel, lowering of the freezing point of the hydrazine and particularly for producing greater specific impulse. It has usually been found that in attaining these advantages the composite fuel mixture has a higher initial decomposition temperature than hydrazine alone.

For example, monomethyl amine nitrate and anhydrous hydrazine containing fuel mixtures exhibit higher decomposition temperatures than hydrazine as do fuel mixtures including monomethyl amine nitrate and unsymmetrical dimethyl hydrazine and fuel mixtures including monomethyl amine nitrate, and anhydrous hydrazine and unsymmetrical dimethyl hydrazine. Monomethyl amine nitrate in the latter mixture lowers the freezing point of hydrazine from about plus 35° F. to about minus 78° F., increases the specific gravity of the fuel mixture from 1.0 to 1.15 and produces a greater specific impulse from about 185 lbs. per lb./sec. to 203 lbs. per lb./sec. However, the initial decomposition of the fuel mixture results in localized temperatures of approximately 2500° F. in the catalyst beds as opposed to approximately 2300° F. for hydrazine. The heretofore used 304 stainless steel wires as catalysts would pit and burn when the higher decomposition temperature mixtures were introduced into the reaction or decomposition chamber of a gas generator of the conventional type gas generators normally employed for these purposes. The platinum or palladium catalyst wires of my invention may comprise screens, coils or wires formed of the elemental platinum or palladium or alloys thereof. In addition, platinum or palladium may be applied to a base wire having the requisite strength such as the refractory metals, for example molybdenum. The platinum or palladium may be coated on the refractory wire in any of the well known methods such as dipping, spraying, brush coating, or plating.

As far as I am aware platinum and palladium or mixtures thereof have heretofore never been employed as a catalyst in a gas generator for promoting decomposition of hydrazine which is a component of a composite fuel mixture including monomethyl amine nitrate.

As illustrative of the present invention, the following examples are given:

Example I

A fuel mixture comprising 50% monomethyl amine nitrate and 50% anhydrous hydrazine was prepared and introduced into a conventional gas generator. Initial decomposition of the hydrazine was obtained employing an oxidizer with which hydrazine is spontaneously combustible, such as nitrogen tetroxide. The hydrazine-monomethyl amine nitrate mixture was ignited in a gas generator in which were positioned wire mesh screens of platinum. By appropriately positioned thermocouples, it was indicated that the initial decomposition of the fuel mixture resulted in localized temperatures of approximately 2500° F. in the top of the catalyst screen bed without pitting or burning of the platinum mesh screens. It will be appreciated that the particular proportions of hydrazine to monomethyl amine nitrate and the fuel mixture to the nitrogen tetroxide, for a particular application, will depend upon such factors as injection ratio, injection aperture size, feed flow rates, combustion chamber area and the like. The thermocouple arrangement also indicated that the exhaust temperature was approximately 1700° F. indicating that the platinum catalyst promoted the decomposition of the hydrazine generated ammonia.

Similar tests were conducted employing platinum wire coil catalysts and palladium screen and wire coil catalysts for initiating decomposition of the exemplary composite fuel mixture.

Example II

Tests similar to those described above in connection with Example I were conducted employing a fuel mixture of 50–50% unsymmetrical dimethyl hydrazine and monomethyl amine nitrate and satisfactory results were obtained employing the various platinum and palladium metals in the forms set forth above.

Example III 304 stainless steel wire was coated with platinum and other specimens of 304 stainless steel wire were coated with palladium and employed as catalysts for decomposition of the fuels set forth in Examples I and II above without pitting or burning of the thus coated wire.

Example IV

Molybdenum wires and screens were coated with platinum and molybdenum wires and screens were coated with palladium and positioned in a gas generator to act as catalysts for decomposition of composite fuel mixtures consisting of 50% monomethyl amine nitrate, 44% anhydrous hydrazine, and 6% unsymmetrical dimethyl hydrazine. The above fuel mixture lowers the freezing point of hydrazine from about plus 35° F. to minus 78° F., increases the specific gravity of the mixture from 1.0 to 1.15 and produces a greater specific impulse from 185 lbs. per lb./sec. to 203 lbs. per lb./sec. The initial decomposition of the mixture resulted in localized temperatures of approximately 2500° F. in the top of the catalyst beds as opposed to approximately 2300° F. for hydrazine alone and a temperature reduction at the exhaust end of the generator of approximately 1700° F. The platinum and palladium coatings were applied to the molybdenum wire by dipping and permitting the platinum to cool. The test results under conditions similar to those set forth above in connection with Example I employing the platinum coated molybdenum wire and palladium coated molybdenum wire were terminated, and upon examination the thus coated wires were free of pitting or burning indications.

While I have described certain fuel mixtures as examples of practical applications of the present invention, it is to be understood that they are merely illustrative, and other compounds and ratios thereof may be readily used and are within the contemplated scope of my invention.

I claim as my invention:

1. The method of generating gases from a reaction motor fuel mixture consisting essentially of hydrazine comprising: introducing the fuel mixture into a gas generator, reacting the fuel mixture to produce ammonia, nitrogen and hydrogen and, while the fuel mixture is reacting in the gas generator, contacting the reacting mixture with a solid catalyst taken from the class consisting of platinum and palladium to thereby decompose the ammonia.

2. The method of generating gases from a reaction motor fuel mixture consisting essentially of hydrazine comprising: introducing the fuel mixture into a gas generator, reacting the fuel mixture to produce ammonia, nitrogen and hydrogen, and, while the fuel mixture is reacting in the gas generator, contacting the reacting mixture with a solid platinum catalyst to thereby decompose the ammonia.

3. The method of generating gases from a reaction motor fuel mixture consisting essentially of hydrazine comprising: introducing the fuel mixture into a gas generator, reacting the fuel mixture to produce ammonia, nitrogen and hydrogen, and, while the fuel mixture is reacting in the gas generator, contacting the reacting mixture with a solid palladium catalyst to thereby decompose ammonia.

4. The method of generating gases from a reaction motor fuel mixture consisting essentially of hydrazine comprising: introducing the fuel mixture into a gas generator, reacting the fuel mixture with an oxidizer hypergolically reactive with the fuel mixture to produce ammonia, nitrogen and hydrogen, and, while the fuel mixture is reacting in the gas generator, contacting the reacting mixture with a solid catalyst taken from the class consisting of platinum and palladium to decompose the ammonia.

5. The method of generating gases from a reaction motor fuel mixture consisting essentially of hydrazine and monomethyl amine nitrate comprising: introducing the fuel mixture into a gas generator, reacting the fuel mixture to produce ammonia, nitrogen and hydrogen, and, while the fuel mixture is reacting in the gas generator, contacting the reacting mixture with a solid catalyst taken from the class consisting of platinum and palladium to decompose the ammonia.

6. The method of generating gases from a reaction motor fuel mixture consisting of 50% hydrazine and about 50% monomethyl amine nitrate comprising: introducing the fuel mixture into a gas generator, reacting the fuel mixture to produce ammonia, nitrogen and hydrogen, and, while the fuel mixture is reacting in the gas generator, contacting the reacting mixture with a solid catalyst taken from the class consisting of platinum and palladium to decompose the ammonia.

7. The method of generating gases from a reaction motor fuel mixture consisting essentially of unsymmetrical dimethyl hydrazine and monomethyl amine nitrate comprising: introducing the fuel mixture into a gas generator, reacting the fuel mixture to produce ammonia, nitrogen and hydrogen, and, while the fuel mixture is reacting in the gas generator, contacting the reacting mixture with a solid catalyst taken from the class consisting of platinum and palladium to decompose the ammonia.

8. The method of generating gases from a reaction motor fuel mixture consisting of about 50% unsymmetrical dimethyl hydrazine and about 50% monomethyl amine nitrate comprising: introducing the fuel mixture into a gas generator, reacting the fuel mixture to produce ammonia, nitrogen and hydrogen, and, while the fuel mixture is reacting in the gas generator, contacting the reacting mixture with a solid catalyst taken from the class consisting of platinum and palladium to decompose the ammonia.

9. The method of generating gases from a reaction motor fuel mixture consisting essentially of a member selected from the group consisting of hydrazine and unsymmetrical dimethyl hydrazine and monomethyl amine nitrate comprising: introducing the fuel mixture into a gas generator, reacting the fuel mixture to produce ammonia, nitrogen and hydrogen, and, while the fuel mixture is reacting in the gas generator, contacting the reacting mixture with a solid catalyst taken from the class consisting of platinum and palladium to decompose the ammonia.

10. The method of generating gases from a reaction motor fuel mixture consisting essentially of about 44% anhydrous hydrazine, about 6% unsymmetrical dimethyl hydrazine and about 50% monomethyl amine nitrate comprising: introducing the fuel mixture into a gas generator, reacting the fuel mixture to produce ammonia, nitrogen and hydrogen, and, while the fuel mixture is reacting in the gas generator, contacting the reacting mixture with a solid catalyst taken from the class consisting of platinum and palladium to decompose the ammonia.

11. The method of generating gases from a reaction motor fuel mixture consisting essentially of hydrazine comprising: introducing the fuel mixture into a gas generator, reacting the fuel mixture to produce ammonia, nitrogen and hydrogen, and, while the fuel mixture is reacting in the gas generator, contacting the reacting mixture with a solid molybdenum member covered with a catalyst taken from the class consisting of platinum and palladium to decompose the ammonia component of the reaction products of the fuel mixture.

12. The method of generating gases from a reaction motor fuel mixture consisting essentially of hydrazine and monomethyl amine nitrate comprising: introducing the fuel mixture into a gas generator, reacting the fuel mixture to produce ammonia, nitrogen and hydrogen, and, while the fuel mixture is reacting in the gas generator, contacting the reacting mixture with a solid molybdenum member covered with a catalyst taken from the class consisting of platinum and palladium to decompose the ammonia component of the reaction products of hydrazine.

References Cited in the file of this patent
UNITED STATES PATENTS 2,925,709    Mantell et al. _____ Feb. 23, 1960

OTHER REFERENCES

Kuhn: Journal of the American Chemical Society, vol. 73, pages 1510–1512.

Amano: Journal of the American Chemical Society, vol. 76, pages 42–1–4202.